Aug. 15, 1933.　　　V. J. SIGODA　　　1,922,334
THREAD REMOVING MECHANISM FOR HEMSTITCHING MACHINES
Filed Feb. 4, 1932
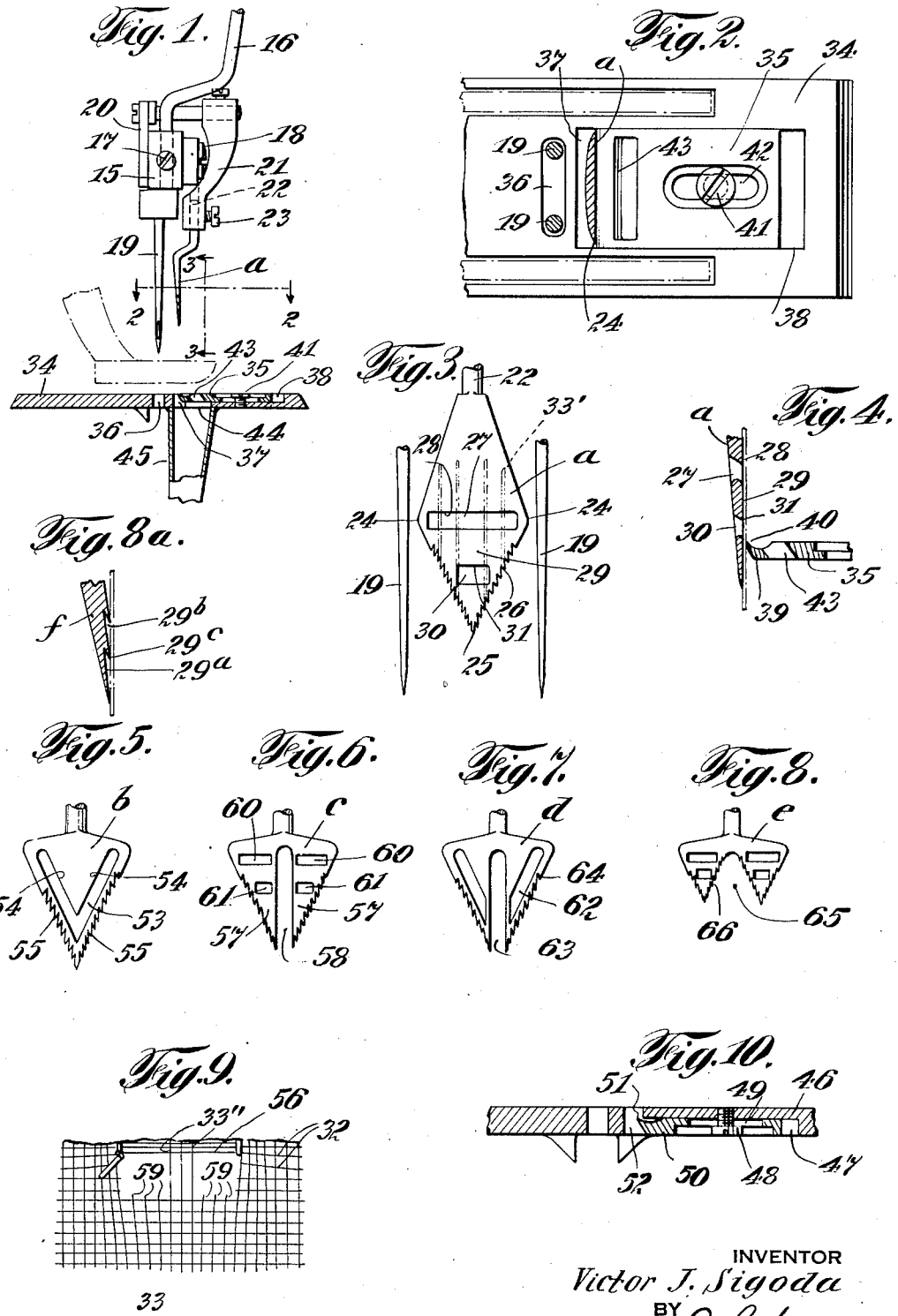
INVENTOR
Victor J. Sigoda
BY C. P. Goepel
his ATTORNEY Patented Aug. 15, 1933

1,922,334

UNITED STATES PATENT OFFICE 1,922,334

THREAD-REMOVING MECHANISM FOR HEMSTITCHING MACHINES

Victor J. Sigoda, Brooklyn, N. Y.

Application February 4, 1932. Serial No. 590,832

15 Claims. (Cl. 112—78)

My present invention relates to hemstitch sewing machines, and it has for its purpose and object the provision of novel means whereby mechanically and in conjunction with the hemstitching to remove from the woven fabric by a shearing operation the threads or fibers necessary to be removed to produce the open work.

The invention is in the nature of a novel attachment devised especially for use in connection with hemstitch machines of the Singer type in general use, such for instance as Nos. 72w19 and 72w20, although it is to be understood that the attachment is not confined to that particular type or to such particular makes of machines.

As is well known in the art, in order to produce the open work where the hemstitch is to take place, it is necessary to withdraw or pull from the fabric a certain number of threads or strands of either the warp or woof according to the direction the hemstitch is to run. The removal of the threads is usually done by hand or by a special thread-drawing machine. With my invention, no hand or special machine-drawing is necessary, as my attachment is applied to the hemstitch-machine and operates in conjunction therewith at the time the hemstitching is performed, to shear off or cut away the threads for the production of the open work. In carrying out my invention, I replace the usual auxiliary piercer by a combination thread-pulling piercer and shearer and this device, operating according to the usual movement of the auxiliary piercer which it replaces, cooperates with a stationary shear plate arranged upon the throat plate of the machine for shearing off the threads necessary to produce the open work.

For convenience of ready description and identification, the combination thread-pulling piercer and shearer will hereinafter at times be referred to and termed the piercer-shear device or element. This piercer-shear device is vertically reciprocated by the operating mechanism for the machine in the same manner as the usual auxiliary piercer which it replaces. In conjunction with the stationary shear plate which is arranged upon the throat plate, this device constitutes the mechanism whereby the threads are removed from the fabric by a shearing off action. By the piercer-shear device, the threads extending transversely to those which are to be cut away are separated and spread in advance of the usual stitching mechanism in the manner usually accomplished by the auxiliary piercer. The piercer-shear blade has roughened or toothed edges for engaging in the fabric and pulling down therefrom on its descending movement the threads to be sheared, and it has slots therein forming shearing edges across which the pulled-down threads are drawn. As the blade descends, its shearing edges are brought into thread-shearing relation with the shearing edge provided on the stationary shear plate whereby to shear off the threads which have been drawn across the slots in the blade. In the Singer type machines above referred to, the work fabric is advanced every third stitch, and the auxiliary piercer is actuated three times to each advance of the fabric. No change in the operation of the machines is required in order to use my improvements therewith; and as the piercer-shear device is substituted for the usual auxiliary piercer, it is operated by the machine-operating mechanism for the auxiliary piercer three times to each advance of the fabric. This triplicate operation results in shearing the threads into fine pieces.

The piercer-shear device of my invention may vary in size in order to produce open work of different widths. The devices may also be produced so as to leave unsheared certain of the threads intermediate the width of the open work.

According to another feature of my invention, the throat plate with the stationary shear plate thereon may be mounted either in the top surface or in the underface of the machine bed-plate, and a suction tube may be provided for the quick removal of the fine sheared off pieces and lint.

With the above and other objects in view, the invention consists in the improved thread-shearing mechanism and in the form, construction and relative arrangement of its several parts as will be hereinafter more fully described, illustrated in the accompanying drawing and claimed.

In the drawing, wherein I have disclosed several simple and practical embodiments of the novel features of my invention, and in which similar reference characters designate corresponding parts throughout the several views:—

Figure 1 represents a fragmentary end elevation and section, showing a hemstitch sewing-machine equipped with the attachment of my present invention;

Fig. 2 is a plan view and section, taken on the line 2—2 of Fig. 1, and looking in the direction of the arrows associated with said line;

Fig. 3 is a fragmentary front elevation, on the line 3—3 of Fig. 1, and looking in the direction of the arrows associated with said line;

Fig. 4 represents an enlarged fragmentary section showing how the piercer-shear device cooperates with the stationary shear plate;

Figs. 5 to 8, inclusive, are fragmentary views showing more or less variant forms of the piercer-shear device;

Fig. 8a is a vertical sectional view through another form of the piercer-shear device;

Fig. 9 is an exaggerated plan view of the woven fabric, showing certain of the threads sheared off to produce the open work; and Fig. 10 is a fragmentary longitudinal sectional view showing a stationary shear plate mounted in the underface of the throat plate.

Referring to the parts of the standard hemstitch sewing-machine shown in the accompanying drawing, 15 denotes the needle holder, 16 the needle vibrating lever, 17 the needle vibrating lever screw and 18 the needle holder hinge screw; all of these parts being of course duplicated in the usual way to provide for the accommodation and operation of the two needles 19, 19, which, through the adjustment of the holders and hinge screws, may be moved relatively toward or away from each other. 20 denotes the auxiliary piercer holder bracket, and 21 the auxiliary piercer holder which receives the stem 22 of my novel piercer-shear blade $a$. As will be readily understood, the stem 22 of the blade $a$ is attachably secured in the holder by means of a set screw 23. In hemstitch machines of the type herein referred to, it is customary for the feeding mechanism of the machine to carry the fabric forward at every third stitch, and this of course means that the piercer in unison with the two vibrating needles moves up and down three times to each forward advance of the fabric.

As clearly shown in Fig. 3, the piercer-shear device $a$ may comprise an elongated blade, expanded widthwise between its ends, its upper portion widening from the stem 22 to the points 24 and its lower portion narrowing from the points 24 to the piercing point 25. The downwardly converging edges of the blade between the points 24 and the piercing point 25 are roughened or provided with fine downwardly projecting teeth 26. At or adjacent to its widest portion, this piercer-shear blade is provided with an elongated horizontal slot 27, the upper defining wall of which is beveled downwardly so as to provide a shearing edge 28 at the front face 29 of the blade. Below said slot 27 there is cut in the blade a second slot 30 the top defining wall of which is also beveled downwardly so as to provide a shearing edge 31 at the front face of the blade. When this blade descends, it separates and spreads in the usual way in advance of the stitching mechanism the threads 32 which extend transversely to the direction of the feed of the work; and certain of the threads 33 which extend in the direction of the feed of the work and which are to be cut away or removed are engaged by the teeth 26 of the piercer-shear blade and pulled down from the fabric so that upon the face 29 of the piercer-shear these threads will be drawn across the slots 30 and 27. In Fig. 3, I indicate by dot-dash lines 33' portions of the threads 33 as having been drawn across the slots 30 and 27 upon the front face 29 of the piercer-shear blade.

In the throat plate 34 which is secured in any usual or approved manner to the bed-plate (not shown) of the machine, I arrange a stationary shear plate 35. The throat plate is provided with the usual needle slot 36 and in front thereof with a slot 37 adapted to receive therein the piercer-shear blade $a$. The stationary shear plate 35 is mounted for longitudinal adjustment in a recess 38 which is in open communication with the piercer-shear blade slot 37. At its rear end the stationary shear plate 35 is formed with an upwardly and rearwardly inclined neck portion 39 having a shearing edge 40, and the plate 35 is adjusted in the recess 38 so that said shearing edge 40 will protrude into the plane of the vertical slot 37 for shearing cooperation with the shearing edges 31 and 28. The stationary shear plate 35 may be adjustably secured to the throat plate by any suitable means, such, for instance, as a set screw 41 which extends downwardly through a longitudinal slot 42 in the stationary plate and is screw-threaded into the throat plate. This arrangement is such that as the piercer-shear blade descends, the thread portions 33' as they are drawn across the slots 30 and 27 will be sheared off by the shearing edges 31 and 28 in coaction with the shearing edge 40. Owing to the spaced relation of the shearing edges 31 and 28 if in accordance with the usual operation of the stitch-forming and feeding mechanisms of the machine the piercer-shear blade $a$ is operated three times to each advance of the fabric in the direction of its feed, the portions 33' are sheared into fine pieces and lint. In front of the neck portion 39, the stationary shear plate 35 is provided with a slot 43 which communicates with a slot 44 in the throat plate. Underneath the throat plate the slot 44 is encompassed by a suction tube 45 by means of which the small pieces and lint resulting from the shearing operations are promptly removed, the fine pieces and lint being drawn with the suction air downwardly through the slots 43 and 44 and thence into the tube 45. By this arrangement, there can be no congestion of the fine pieces and lint to interfere with the stitching mechanism or to annoy the operator.

The stationary shear plate, instead of being adjustably mounted in the top surface of the throat plate as above described, may be mounted in the underside thereof. Thus in Fig. 10, I show a throat plate 46 having a recess 47 in the underside thereof and in which is adjustably mounted by means of a set screw 48 and slot 49 a stationary shear plate 50. The shearing edge 51 of the plate 50 protrudes into the stationary shear plate slot 52 for shearing cooperation with the shearing edges 31 and 28. The fine pieces and lint resulting from the shearing operations pass downwardly through the slot 52. With this form of construction, a suction tube for the quick withdrawal of fine pieces and lint may also, if desired, be associated.

In Figs. 5, 6, 7 and 8, I show respectively variant forms $b$, $c$, $d$ and $e$ of the piercer-shear blade. The blade $b$, of general triangular shape, is provided with a V-shaped slot 53 the converging edges 54, 54 of which extend substantially parallel with the roughened exterior thread-drawing edges 55, 55. The piercer-shear blades $a$ and $b$ shear off consecutively all of the threads 33 for the full width of the open gap. The piercer-shear blades $c$ and $d$, however, are constructed to avoid shearing off certain of the threads 33'' as shown in Fig. 9, intermediate the width of the open work space 56. Referring to Fig. 6, it will be seen that the blade $c$ is formed with two blade portions 57, 57 between which is an opening 58 for receiving therein the threads 33'' which are not to be sheared off. On either side of the threads 33'' the sheared off edges of the threads 33 are indicated at 59. By the use, therefore, of a shear blade such as $c$ certain of the threads intermediate the width of the open work and extending in the direction of the feed of the work are permitted to remain intact so as to add to the attractiveness of the hemstitching; whereas with the use of shearing blades as *a* and *b*, all of the threads 33 will show cut off ends as 59 for the full width of the open work. Both portions 57, 57 of the piercer-shear blade *c* are represented as being provided with two shear edged slots 60 and 61. In the piercer-shear blade *d*, the shear edged slots 62 are shown as inclined with respect to the open central slot 63 and as lying substantially parallel with the exteriorly toothed edges 64. The piercer-shear blade *e* is represented as provided with a relatively wide central opening 65, and in this case the edges of the blade defining this opening are inclined along upwardly converging lines and are provided with downwardly extending teeth 66. The piercer-shear blade *e* is designed especially for use in the production of a relatively wide hemstitch.

In Fig. 8a, I show a piercer-shear blade *f* in which the shearing edges are provided on the face 29a of the blade in a different way. In this form, instead of providing slots with shearing edges, the face 29a of the blade is made with cavities or openings 29b to produce downwardly projecting shearing edges 29c which cooperate with the shearing edge of the stationary shear plate for shearing off the threads.

It will be recognized that piercer-shear devices made and constructed in the variant embodiments herein illustrated may be produced with standard stems adapted to be received in the standard auxiliary piercer holders of the machines for which they are intended, and further that, where it is necessary, desirable or expedient, special holder brackets adapted to be attached to any particular make of machine, may be provided for the piercer-shear holders. It will also be recognized that the piercer-shear devices, involving the principle of my invention, may be made in forms other than the variant forms herein particularly illustrated by way of example. Furthermore, it will be recognized that the piercer-shear devices may vary in shape to operate upon textiles of different character and whether fine or coarse, and may vary in size according to the width of the open work to be produced.

While the invention has been illustrated and described with some degree of particularity, it is realized that in practice various changes and alterations may be made therein, and further that the invention is capable of embodiment in many different stitching mechanisms. It has been sought herein to illustrate only such embodiments as will suffice to exhibit the character of the invention. Reservation is, therefore, made to the right and privilege of changing the form of the details of construction or otherwise altering the arrangement of the parts without departing from the spirit or scope of the invention or the scope of the appended claims.

I claim:—

1. In a hemstitch sewing-machine, a throat plate, a piercer-shear blade arranged for movement with respect thereto and adapted to draw threads from the fabric, shear means on the blade across which the drawn threads are extended, and shear means associated with the throat plate, with respect to which the shear means of the blade on the movement of the latter comes into shearing relation for shearing off the threads extended across the shear means of the blade.

2. In a hemstitch sewing-machine, a member having a shear edge, a piercer-shear blade arranged for movement in a plane at an angle to said shear edge and having a working face adjacent the same for the retention of threads which are to be sheared, a shear edge provided on the working face of the blade and across which the threads may be extended, said first and second named shear edges being shaped for shearing coaction, whereby, on movement of the blade, to shear off the threads extended across the shear edge on the working face of the blade.

3. In a hemstitch sewing-machine, the combination of stitch-forming mechanism, a piercer-shear blade associated therewith, adapted on its movement to engage and pull threads from the fabric, a shear edge on the blade across which the pulled threads are extended, and means arranged to cooperate with said shear edge whereby to shear off the threads which are extended across such shear edge.

4. In a hemstitch sewing machine, the combination of stitch-forming mechanism, a piercer-shear blade associated therewith, adapted on its movement to engage and pull threads from the fabric, a shear edge on the blade across which the pulled threads are extended, and means arranged to cooperate with said shear edge whereby to shear off the threads which are extended across such shear edge, comprising a plate having a shear edge at one end thereof.

5. In a hemstitch sewing-machine, a throat plate, stitch-forming mechanism adapted to be reciprocated, receivable in an opening in the throat plate, a piercer-shear blade associated with the stitch-forming mechanism receivable in an opening in the throat plate, means on said blade for engaging and pulling threads from the fabric to be extended upon the blade, a shear edge on the blade across which the pulled threads are extended, and shear means associated with the throat plate opening for the blade and with respect to which the shear edge on the blade has shearing cooperation for shearing off the pulled threads extended across the shear edge of the blade.

6. In combination with a hemstitch sewing-machine having a stitch-forming mechanism and a throat plate for the same, a piercer-shear blade associated with the stitching mechanism and movable into and out of an opening in the throat plate, said blade having roughened edges for engaging the fabric threads and drawing them over the face of the blade on movement of the blade into the opening, shear edges provided at the face of the blade and across which the threads are drawn, and a member in said throat plate having a shear edge with which the shear edge of the blade cooperates to shear off the threads, said member being adjustable on the throat plate to position its shear edge in the throat plate opening.

7. An improved piercer-shear device including a blade, roughened edges on the blade converging toward the piercing point for engaging and drawing the threads, said blade being provided with shear edges at its working face across which the engaged threads may be drawn from the roughened edges on the piercing movement of the blade.

8. An improved piercer-shear device including a blade having edges converging toward the piercing point thereof, and roughened for engaging and drawing the threads to be sheared, together with openings and shearing edges on the blade, provided at points between the converging edges and across which the threads may be extended from the engaging roughened edges, whereby to be sheared.

9. An improved piercer-shear device including a blade having an open space therein and having edges converging toward the open end of said space to provide opposing piercing points, fine teeth on said converging edges for engaging and drawing the threads to be sheared, together with shearing edges on the blade, provided at points between said space and the converging edges and across which the threads may be extended from the engaging roughened edges, whereby to be sheared.

10. An improved piercer-shear device including a blade having spaced portions each having edges converging toward a piercing point, fine teeth on said converging edges for engaging and drawing the threads to be sheared, together with shear edges on each of the portions provided at points between the converging edges thereof and across which the threads may be extended from the engaging roughened edges, whereby to be sheared.

11. In a hemstitch sewing-machine, the combination of a vertically reciprocating piercing blade having slots therein forming shearing edges at one face thereof, and a plate arranged at an angle to the path of movement of the piercing blade and having a shear edge with which the shearing edges of said piercing blade are adapted to cooperate in shearing off threads overlying said face and extending across said slots.

12. In a hemstitch sewing-machine and in combination, a vertically reciprocating piercing blade the converging sides of which are roughened toward the piercing point to engage and draw threads from the fabric, shearing edges on the blade, provided at points between the converging edges, and a plate arranged at an angle to the path of movement of the piercing blade and having a shearing edge adapted to cooperate with the shearing edges of the piercing blade for shearing off threads extended from said thread-engaging roughened edges across the shearing edges of the piercing blade.

13. In an article of manufacture, a piercer-shear device of the character described comprising a stem, a blade connected at one end to the stem and having a working face for the retention longitudinally of the blade of extended threads which are to be sheared, said face having in a direction crossing the longitudinal extent of the blade a shear edge across which to dispose the extended threads for shearing.

14. As an article of manufacture, a piercer-shear device of the character described comprising a stem, a blade connected at one end to the stem and having a working face for the retention of extended threads which are to be sheared, said face having adjoining shear edges and openings across which to dispose the extended threads for shearing.

15. As an article of manufacture, a piercer-shear device of the character described comprising a stem, a blade connected at one end to the stem and having a working face for the retention of extended threads which are to be sheared, said face having adjoining shear edges and openings across which to dispose the extended threads for shearing, and said shear edges being in spaced relation for shearing the extended threads at different places.

VICTOR J. SIGODA.